Feb. 13, 1934.  E. J. SCHAUB  1,946,764
FILM REEL
Filed Jan. 20, 1930  2 Sheets-Sheet 1
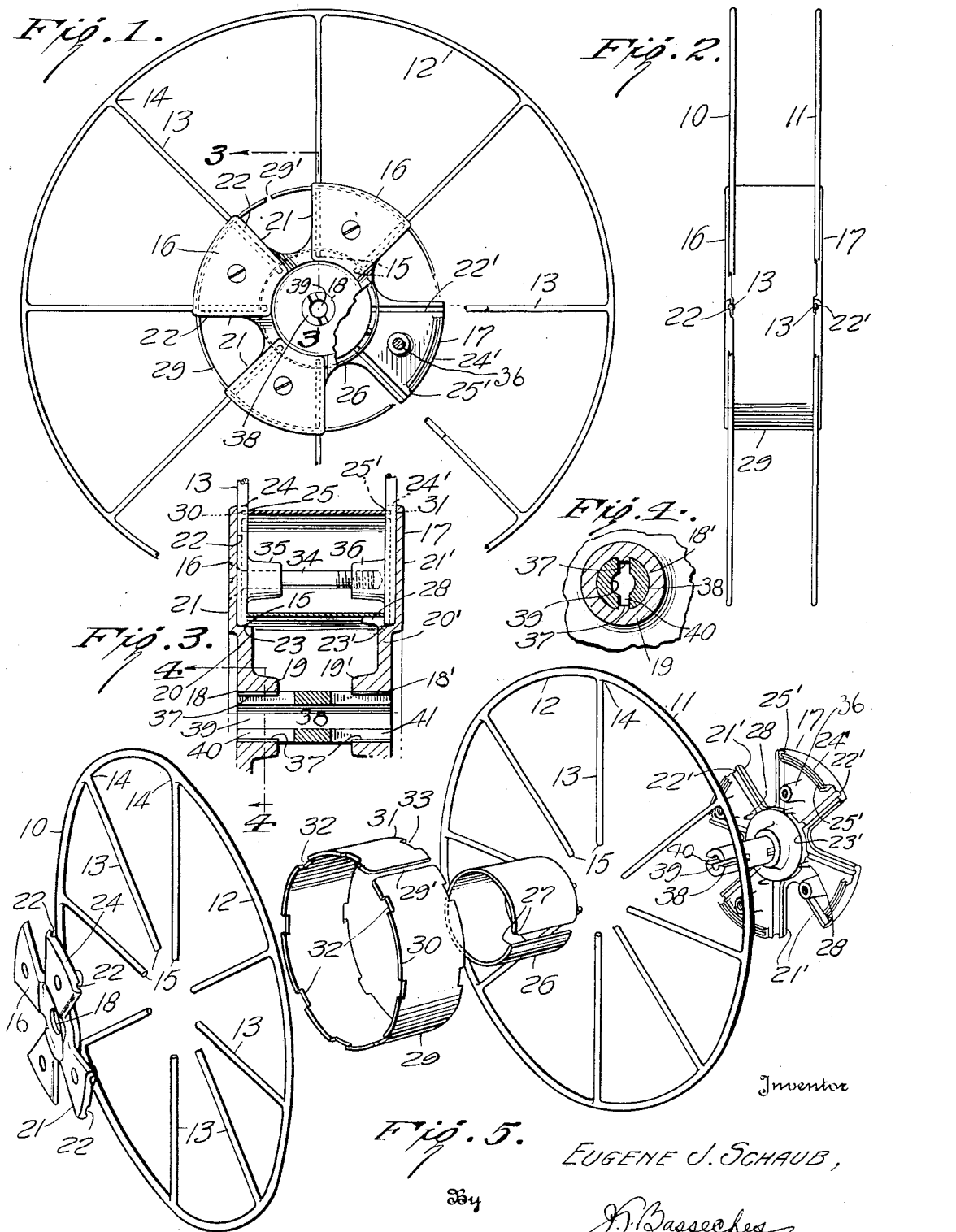
Inventor
EUGENE J. SCHAUB,
By J. Basseches
his Attorney Feb. 13, 1934.  E. J. SCHAUB  1,946,764
FILM REEL
Filed Jan. 20, 1930  2 Sheets-Sheet 2
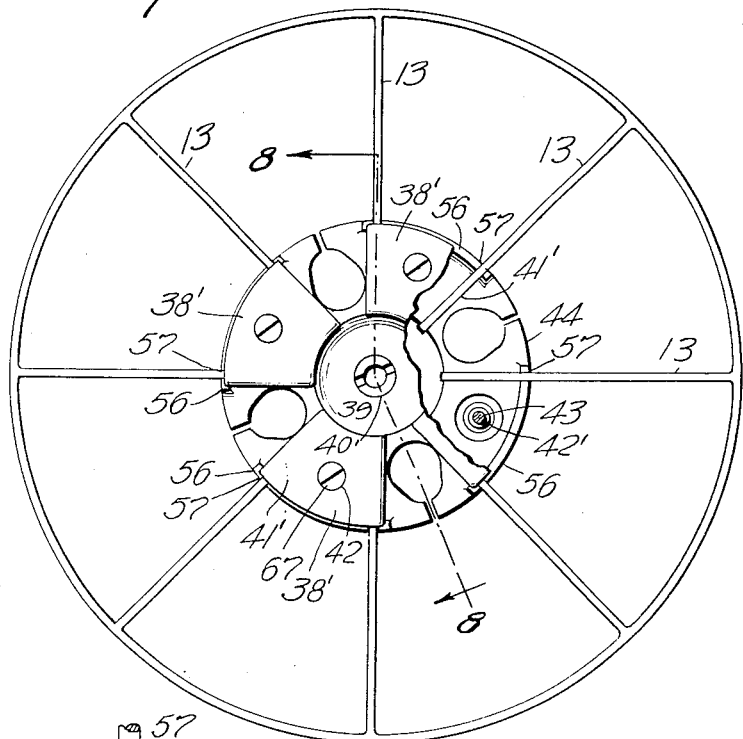
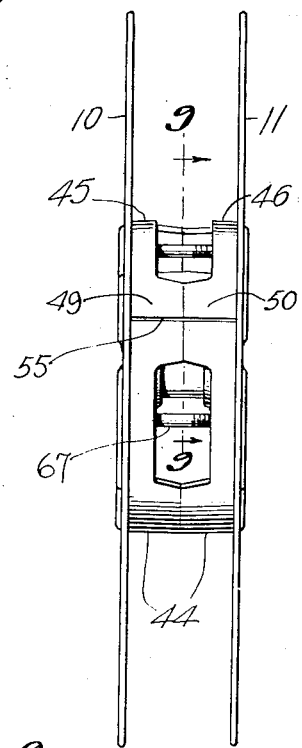
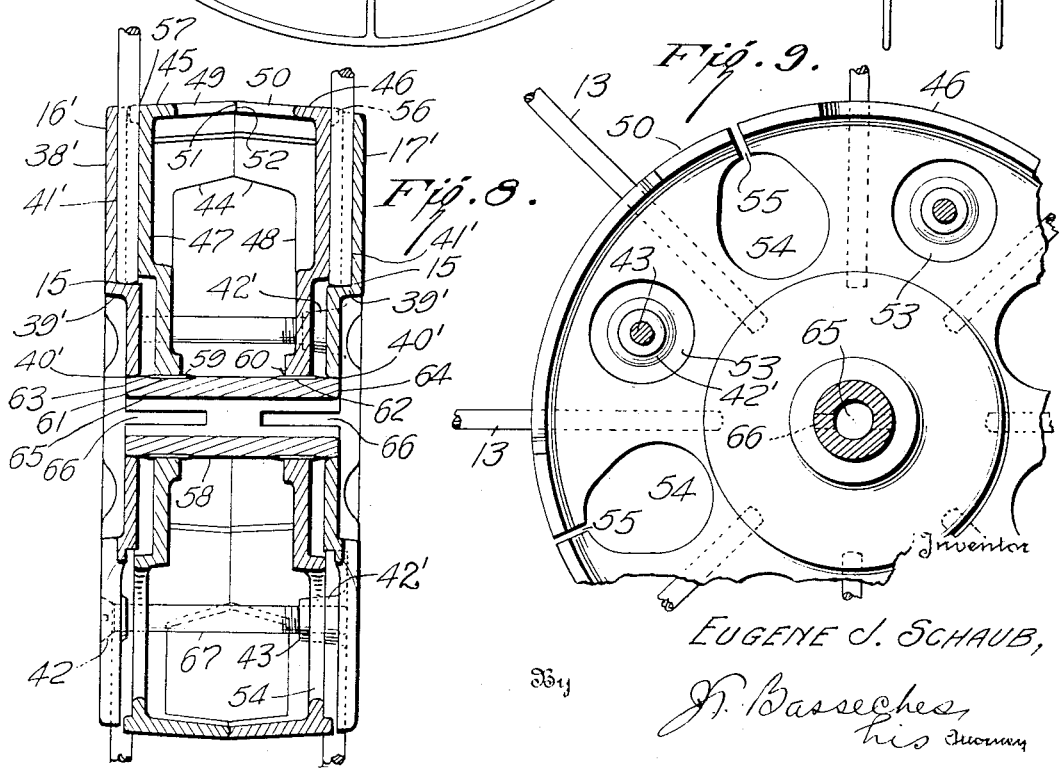
Eugene J. Schaub, Patented Feb. 13, 1934 　　　　　　　　　　　　　　　　　　　　　1,946,764

UNITED STATES PATENT OFFICE 1,946,764

FILM REEL

Eugene J. Schaub, Corona, N. Y.

Application January 20, 1930. Serial No. 421,913

11 Claims. (Cl. 242—70)

This invention relates to motion picture film reels.

It is an object of my invention to provide a motion picture film reel which may be facilely handled by the operator in threading motion picture films characterized by providing a skeleton frame and substantially rigid hub whereby the film may be facilely threaded upon the reel and permit the operator to have ready access to the film rolled or unrolled on the reel.

Other objects of my invention reside in the provision of a reel having constructional features giving all the rigidity and strength necessary in handling a motion picture film reel, at the same time providing simplicity of construction which will effect a high order of economy in manufacture, both from the standpoint of economy in manufacturing the parts constituting my film reel and also in the assembly of these parts.

To attain these objects and such further objects as may appear herein or be hereinafter pointed out or appear in the claims forming a part hereof, I make reference to the accompanying drawings, in which—

Figure 1 is a fragmentary plan view of my device;

Figure 2 is a fragmentary end elevation;

Figure 3 is an enlarged section taken on the line 3—3 of Figure 1;

Figure 4 is a section taken on the line 4—4 of Figure 3;

Figure 5 is a perspective exploded view of my device;

Figure 6 is a plan view of another embodiment of my invention;

Figure 7 is an end elevation thereof;

Figure 8 is an enlarged section taken on the line 8—8 of Figure 6;

Figure 9 is an enlarged section taken on the line 9—9 of Figure 7.

Generally, my invention comprises a film reel formed of complemental spoked side flanges made of wire in which the spokes are brazed or spot welded at the peripheral edges of the portion forming the tire, with the spokes free at their hub terminal edges. A pair of such complemental spoked flanges are held in rigid assembly upon a hub forming portion serving in the nature of a spacer for these flanges, the hub forming portion including spacer members which rigidly hold the spokes of the flanges in predetermined radial position and include abutting portions which prevent axial displacement towards the center. This hub assembly preferably includes castings provided with the outlines for the spokes of the flanges, as well as providing the abutment supports at the hub terminal edges of the spokes, the castings being drawn towards each other against a central spacer member by a bolt construction or similar fastening means, to provide a simple manner of assembly and economy of construction, characterized by requiring a minimum amount of machining. Furthermore, the invention contemplates using rather light weight metal for the hub forming portion or parts thereof, such as characteristic of aluminum alloys and assembly with the casting portions, a central tougher metal keying member for the shaft on which the film reel is mounted, all the parts being susceptible of ready and facile assembly by manual labor without the aid of special tools, otherwise entailing expensive equipment to manufacture and construct the parts.

As briefly above referred to, my reel in the preferred embodiment of my invention, comprises a pair of flanges 10 and 11 comprising a continuous wire tire 12, at the periphery, the ends of the wire being brazed or spot welded to form the continuous ring and includes radially disposed spokes 13, having one end thereof 14 brazed or spot welded in the tire 12. The inner edges 15 terminate short of the axial line for purposes which will appear more clearly as this description proceeds, and for assembling these parts into a reel, there are provided exterior castings 16 and 17. The casting 16 is cast with a central opening 18, about which appears an extended boss 19, immediately adjacent the axial line and a central hub forming portion 20, provided with radially disposed extensions 21, each of which is formed at its interior surface with radial grooves 22, adapted to receive the spokes 13. Adjacent the inner end of these grooves, the casting is provided with an abutting shoulder 23, serving as a snug support for the terminal edges 15 of the spokes. The periphery of the extensions 21 is provided with an inwardly directed flange 24, slotted circumferentially at 25, for purposes which will appear more clearly as this description proceeds.

With a casting thus provided, the skeleton flange 10 may be assembled with the casting 16, merely by aligning the spokes 13 with the radial grooves 22. Frictional engagement of this flange with the casting 16 may be obtained by springing the terminal edges 15 of the spokes over the shoulder 23 to hold the casting and flange 10 assembled.

The end plate casting 17 is similarly cast with a central orifice 18', a boss 19', a central hub forming portion 20' and radial extensions 21', into each of which is formed the radial grooves 22'. As in the complemental casting, centrally thereof I provide a central abutting shoulder portion 23' adjacent the axial line of the extensions 21' and an inwardly directed flange 24', formed with a circumferentially slotted portion 25' adjacent the periphery thereof. As in the complemental casting 16, with a casting so provided, I may assemble the wired spoked flange 11 by merely disposing the spokes 13 within the grooves 22' and hold the casting with this wire flange in assembled position by springing the terminal edges 15 over the shoulder 23', the resiliency of the wire tire 12 being sufficient to force the spokes radially upon the shoulder 23' and hold the parts in frictional engagement.

With the plate 17 and wire flange 11 thus assembled, I then provide an axial spacer member 26, cylindrically formed by cold rolling a sheet of metal, the terminal edges 27 being left open to permit this cylindrical portion to be spread. The nature of this cylindrical member is resilient, due to the cold rolling and in order to hold it assembled with the plate 17, this latter member is cast with a plurality of risers 28, radially disposed adjacent the central bead portion 20'. The cylindrical spacer member 26 is then held in assembled position with the plate 27 and the wire flange 11 assembled therewith by slightly spreading the same and permitting it to contact about the plurality of risers 28. In addition, I also provide a hub spacer member 29 comprising a cold rolled sheet of metal whose diameter is exactly the same as that of the flange 24 and the groove 25 and 25' formed in the plates 16 and 17. The hub plate 29 thus provided has formed in the edges thereof 30 and 31 a plurality of notches 32 and 33, to each end thereof. These notches correspond in position and number to the spokes 13 in the wire flanges 10 and 11, respectively.

For final assembly, the edge 30 of the hub spacer cylinder 29 is fitted into the slot 25, with the spacer notches 32 spanning each of the spokes 13 of the wire flange 10. The plate 16 then carries the wire flange 11 and the hub spacer roll 29. The plate 17 carries the wire flange 11 and the axial spacer member 26. These two parts are then brought together so that the edge 31 of the cylindrical roll 29 fits within the slot 25' of the plate 17, with the notches 33 spanning each of the spokes 13 of the wire flange 11. With the parts so assembled, a plurality of bolts 34 serve to tie the parts together and for this purpose the plates 16 and 17 are provided with bosses 35 and 36, one orificed and counter-sunk to receive the head of the bolt 34 and the other boss screw threaded to make threaded engagement with the other end of the bolt 34. With the parts thus assembled, the central orifices 18 and 18' are reamed out with a drift to leave a shoulder 37. Into this orifice so reamed, there is then provided a tempered spindle 38 of a length corresponding to the total thickness of the assembly at the central portion 18 and 18'. This spindle is preferably a hardened steel sleeve, orificed at 39, to receive the reel shaft of either the motion picture machine or the winding device and is slotted diametrically at 40 and 41. This part is affixed with the castings formed by the plates 16 and 17 by aligning the slotted portions 40 and 41 with the shoulders 37 left in the orifices 18 and 18', assembly being obtained by forcing the spindle 38 in to the orifice by means of a press, as will be readily understood. Optionally, however, I may only anchor the spindle in a punch press in the plate 17, as illustrated, and draw the spindle into the plate 16 at the time that the plates 16 and 17 and the flanges and spacers carried thereby are united, in which case the friction of pressing the spindle into the orifice 18 will be sufficient to hold the plates together until final assembly by the bolts 34.

In this manner I have provided a film reel which comprises simple castings and parts requiring no special machinery to rigidly hold the skeleton-like flanges in relation to the hub forming portion. In addition, also, though the parts comprise several members, by reason of the resilient tie which each of the members make with the casting, they may be facilely handled prior to final assembly.

The slot 29' serves as a starting for the film which may readily be reached by the fingers of the operator between the space provided by the extensions 21 and the spokes 13.

In Figures 6, 7 and 8 I have shown another embodiment of my invention wherein skeleton wire flanges 10 and 11 made as in the prior embodiment, are provided with a hub portion serving as a base or spool to start the rolling of the film. In this embodiment, end plates 16' and 17' are provided, constituting four extensions 38', joined centrally by an inwardly formed circular hub forming portion 39', with a central axial orifice 40'. Each extension 38' has formed interiorly thereof pairs of slots 41', radially disposed, adapted to accommodate the spokes 13 of the flange. The slots 41' are provided in number and position to correspond to these spokes, as will be readily understood. Substantially centrally of each extension 38' of the plate 16', there is a counter-sunk orifice 42 through which the bolt may be passed. The plate 17' has cast therewith a plurality of bosses 42', which are drilled and screw threaded at 43 to receive a bolt, as will be readily understood as this description proceeds.

For purposes of forming the complete hub portion, I provide a spacer hub casting, generally referred to at 44 comprising two sections 45 and 46, having disk side walls 47 and 48 and peripheral flanges 49 and 50, arranged to be in edge engagement and for this purpose the edge 51 is convex and the edge 52 concave, to give a keying action between these parts, preventing lateral displacement. The casting is so made to provide in the side walls 47 and 48 a plurality of orifices 53 and 54. The latter connect with the complemental flanges 49 and 50 and through the latter connecting with the orifice 54, I provide a saw cut 55, for purposes which will appear as this description proceeds.

Outwardly directed from the walls 47 and 48, the periphery of the castings is provided with a flange 56 and this is slotted at 57 in number and position corresponding to the spokes 13 of the wire skeleton flanges. The sections 45 and 46 may be assembled with each other by providing a hard metal sleeve 58 which fits within the orifices 59 and 60 of the sections 45 and 46. This sleeve 58 is preferably formed of iron and has formed at its periphery at spaced portions with knurled portions at 61 and 62 about the periphery thereof. For fixedly positioning the sleeve this member is forced into the orifices 59 and 60 so that the knurled portions 61 and 62 bite into the side walls of the orifices 59 and 60, the metal of the sections 45 and 46 being preferably of softer metal, such as aluminum or aluminum alloy. The sleeve 58 is preferably forced into this position in a punch press.

A substantial portion of the edges of the sleeve 63 and 64 extends beyond the sections 45 and 46, as will be understood. The sleeve is also provided with a central boring 65, adapted to fit the reel spindle of the motion picture device or a winding device and for purposes of locking the same on either of these shafts, a slotted keyway 66 is provided.

For purposes of assembling the central spacer casting as described, the plates 16' and 17' each has assembled therewith the skeleton wire spider flanges 10 and 11 respectively, preferably by positioning the spokes 13 within the slots 41' and springing the terminal edges 15 over the shoulder 39' of each end plate, the resiliency of the wire giving sufficient frictional contact to hold the skeleton frame and plate in assembled relationship.

With each of the plates thus assembled with a wire flange, these wire flanges are assembled with the spacer casting 44 by bringing the spokes 13 in alignment with the notches 57 and pressing the ends of the sleeve 63 and 64 into the orifices 40', formed in each of the plates 16' and 17', respectively. This may also be done upon a punch press to assure a tight fit between the sleeve 58 and the orifices 40'.

To permanently tie the parts in assembled relationship, a plurality of bolts 67 are passed through the orifices 42 to engage the screw threaded boss 42', thus tying the parts into rigid assembly.

It will thus be observed that I have provided a film reel which may readily be utilized for threading and starting a film for winding, which by reason of the skeleton construction, permits the fingers to be readily inserted to affix an end of the film upon the slots provided in either of the hub forming portions of the embodiments illustrated. The reels will stand abuse by the rigid construction, and if bent, replacement may be easily effected by merely spreading the wire skeleton flanges. All this is accomplished by providing a material having the requisite lightness of weight, characteristic of using aluminum or aluminum alloy castings, yet giving the strength necessary at the keying portion or central sleeve for effecting a long life for the part which will receive abuse. The sleeve and the casting of the embodiment being preferably machined, it assures trueness of rotation of the reel, thereby avoiding the wear and tear on the film and the sprocket perforations thereon as would otherwise be the case if the parts were made of metal stampings.

Having thus described my invention and illustrated its use, what I claim as new and desire to secure by Letters Patent, is—

1. A film reel including spaced wire spoked flanges, a hub assembly therefor, means to hold the spoked portions of said flanges against displacement on said hub portion, a cylindrical portion between said flanges, said hub portion including, spaced, radially disposed extensions made in said cylindrical portion accessible for starting the winding of the film.

2. A film reel including spaced wire spoked flanges, spacer members for said flanges comprising sheet metal cylindrical members, end plates including radially depressed portions for engagement by the spokes of said flanges, fastening means to hold plates, flanges and spacer members in rigid assembly and a spindle sleeve pressed into and held by said end plates.

3. A film reel including spaced flanges, a hub assembly comprising sheet metal rolled cylindrically, forming spacer members for said flanges, end plates and means to hold said end plates against displacement towards each other, and means comprising a concentrically formed slot formed on said plates to hold said cylindrical spacer members against radially inward or outward displacement from the predetermined cylindrical contour.

4. A film reel comprising spaced flanges, a hub portion including a rolled sheet metal spacer member, end plates cooperating with said spacer member including fastening members to hold said flanges against said spacer member, said end plates comprising spaced extensions, making said cylindrical portions accessible to the fingers for starting the winding of the film thereon.

5. In a film reel, including spoked flanges made of wire and comprising a spacer member, of cast end plates arranged to cooperate with fastening means to rigidly dispose the flanges upon said spacer member, of concentrically positioned means formed on said plates to engage said spacer members and spokes and hold the same against displacement from the cylindrically formed contour.

6. In a film reel comprising flanges formed of wire and including spokes, of a hub assembly including a spacer member for said flanges, means formed on said spacer member to predeterminedly hold the spokes of said flanges in predetermined radial position, of end plates cooperating with said spacer member and independent fastening elements to draw said flanges against said spacer member, said end plates including abutting shoulders to prevent radial displacement and frictionally mounting of the spokes of said flanges.

7. In a film reel comprising flanges formed of wire and including spokes, of a hub assembly including a spacer member for said flanges, means formed on said spacer member to predeterminedly hold the spokes of said flanges in predetermined radial position, of end plates cooperating with said spacer member and fastening elements to tie said plates and flanges against said spacer member, said end plates including abutting shoulders to prevent radial displacement of the spokes of said flanges and to frictionally mount said flanges, and a spindle sleeve having a keying connection pressed in said end plates.

8. In a film reel comprising wire spoked flanges, end flanges, a hub assembly for mounting said flanges engaging the spokes thereof comprising a machined spindle sleeve and machined end plate castings in which said spindle is centered and a cylindrical portion for starting the winding of the film having common axial machined mounting with said spindle sleeve.

9. In a film reel comprising spoked end flanges, a hub assembly for mounting said flanges engaging said spokes, comprising aluminum end plates machine orificed axially and a machined spindle sleeve including a keying slot pressed into said end plates, a cylindrical portion serving as a core to wind the film mounted concentrically relatively to said sleeve and means to tie said assembly and spokes rigidly.

10. In a film reel, including spaced wire spoked flanges, and including a spacer member forming a hub portion of end plates adapted to cooperate with said spacer member to provide a hub assembly, said end plates including radially formed recesses and an axial support in which the spokes of said flanges are adapted to be retained.

11. In a film reel, including spaced wire spoked flanges, and including a spacer member forming a hub portion, of end plates adapted to cooperate with said spacer member to provide a hub assembly, said end plates including radially formed recesses in which the spokes of said flanges are adapted to be retained, the recessed portions including abutting shoulders for the end of the spokes of said flanges.

EUGENE J. SCHAUB.